Patented May 18, 1926.

1,584,852

UNITED STATES PATENT OFFICE.

MARC DARRIN, OF WILKINSBURG, PENNSYLVANIA, ASSIGNOR TO THE KOPPERS COMPANY, OF PITTSBURGH, PENNSYLVANIA, A CORPORATION OF PENNSYLVANIA.

RECOVERY OF THIOCYANATES.

Application filed January 16, 1923. Serial No. 612,918.

Figure 1:
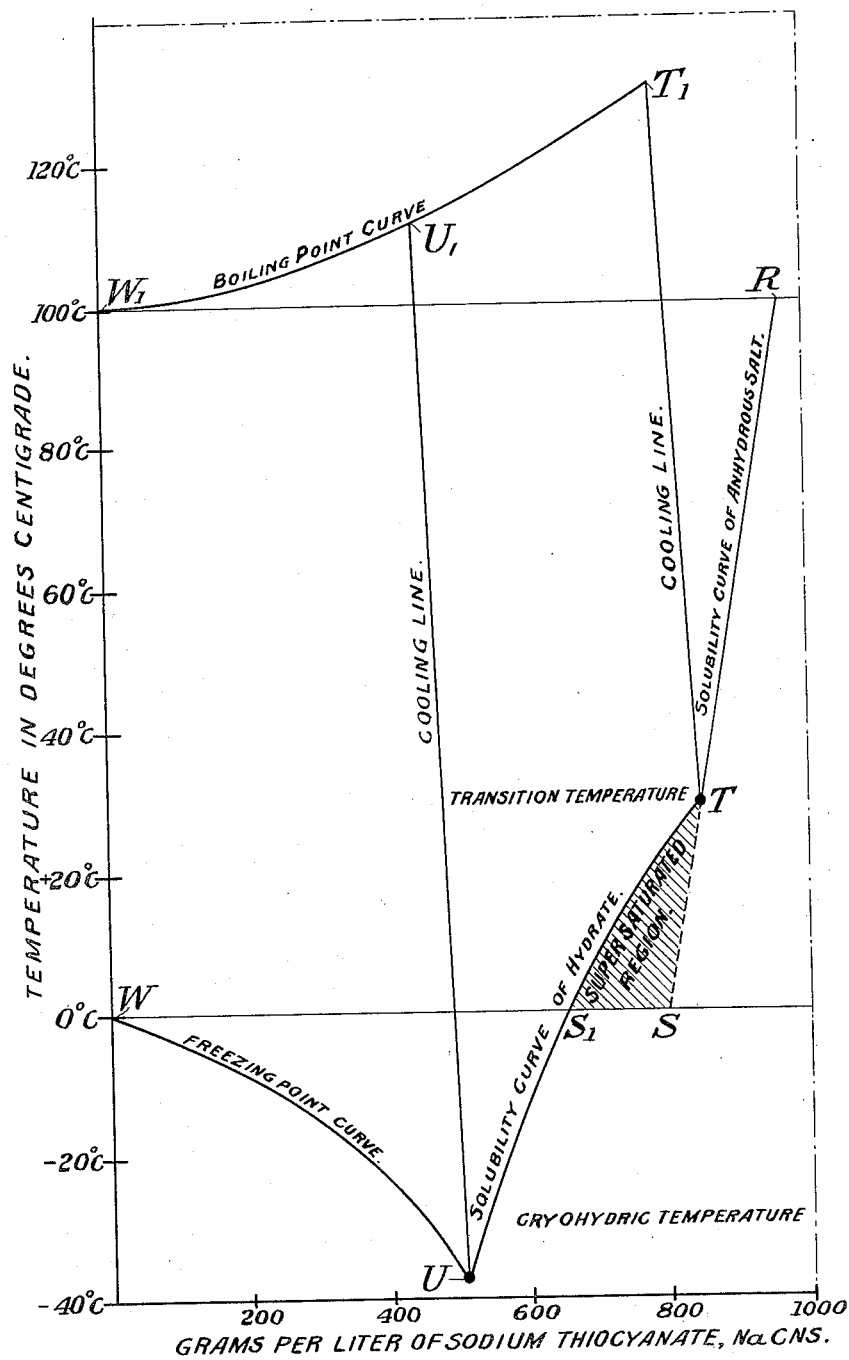
Figure 2:
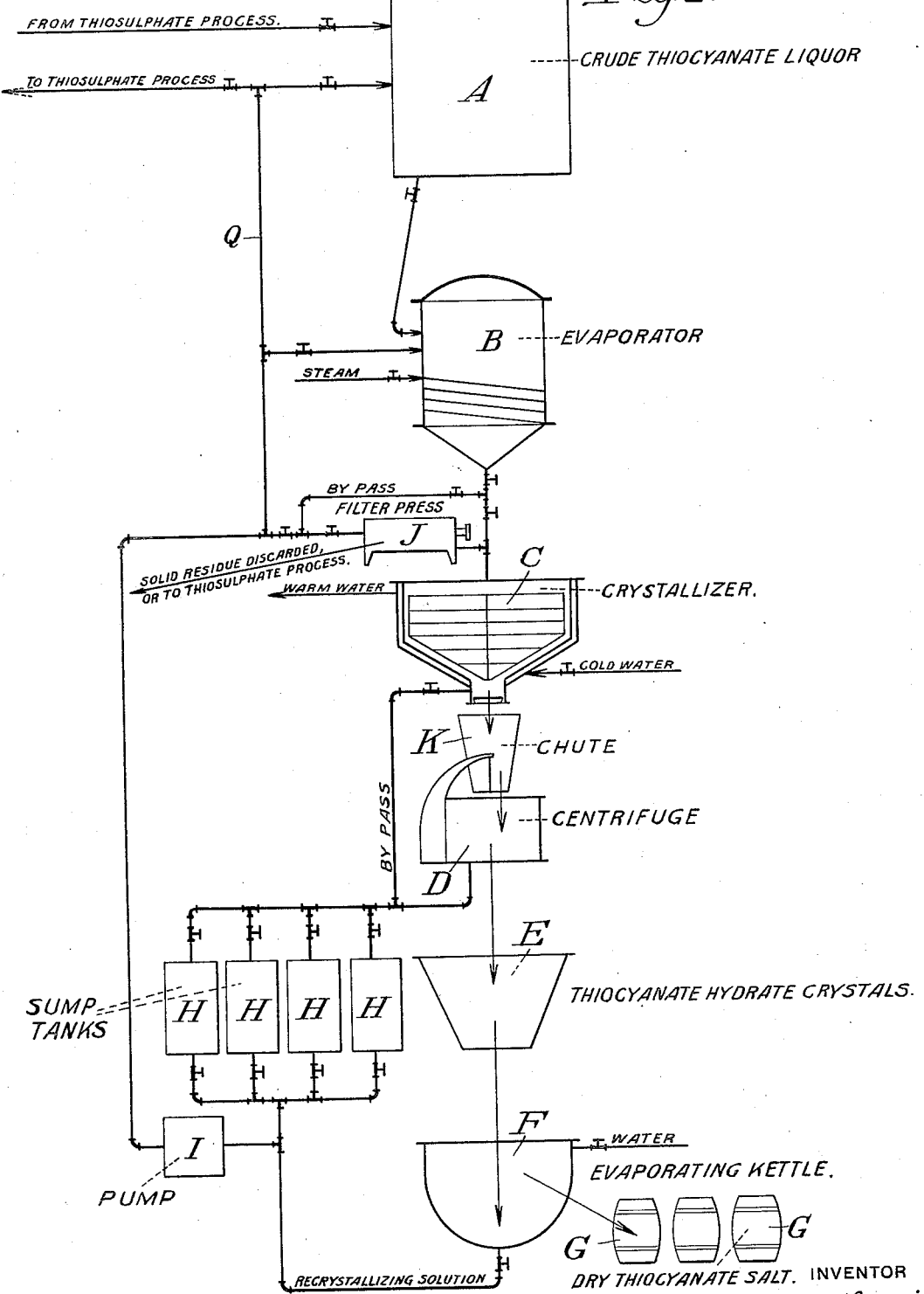

Figure 1 is a graph showing the solubility and boiling point relations of sodium thiocyanate and its hydrate; and Figure 2 is a schematic diagram of apparatus for carrying out the process.

The present invention relates to the recovery of thiocyanates, and more especially to the recovery of sodium thiocyanate from solutions containing other salts or impurities, such, for example, as sodium thiosulphate, sodium carbonate, sodium bicarbonate, organic substances sulphur compounds, iron compounds, colloidal matter, etc.

The process effects a separation of the thiocyanate by the crystallization of the hydrate. The process is economical to operate, and does not require the use of special solvents, such as alcohol. Moreover, it dispenses with treatment with de-colorizing agents, such as charcoal. It produces a uniform and pure product at a low cost. It does not require evaporation of solutions to dryness and subsequent extraction.

Sodium thiocyanate, NaCNS, is very soluble in water, over 1000 grams per liter at the boiling temperature of the saturated solution, and about 850 grams per liter at 30° C. For this reason, it has been found difficult and not commercially practicable to separate the sodium thiocyanate from other soluble compounds by crystallization. In mixtures containing sodium thiocyanate and sodium thiosulphate, it is possible to remove some of the thiosulphate by direct crystallization. However, as a very appreciable amount of the thiosulphate remains in solution, it contaminates any thiocyanate obtained by further crystallization or evaporation to dryness. Sodium thiocyanate also has a high solubility which prevents its separation by further crystallization. Because of the high solubilities of the salts, methods for separation requiring the use of special solvents, have been employed, such as the use of alcohol as a solvent, sodium thiocyanate being soluble in alcohol but sodium thiosulphate being insoluble. The alcohol extraction, however, is expensive due to loss of alcohol and the necessary auxiliary operations for its recovery and purification. Moreover, certain highly colored impurities are dissolved in the alcohol along with the sodium thiocyanate and require treatment with charcoal for their removal.

I have discovered that by proper regulation of concentrations and temperature it is possible to crystallize a hydrate of the thiocyanate, which has a considerably lesser solubility than the usual anhydrous salt.

The invention will be explained with particular reference to the recovery of sodium thiocyanate, this being the most common thiocyanate salt to be commercially recovered. It is to be understood, however, that the process may be employed for recovering other thiocyanates, such as the alkali metal thiocyanates, including potassium thiocyanate.

The hydrate of sodium thiocyanate which I have crystallized, has the formula $NaCNS.2H_2O$. Its properties are as follows: melting point 33° C.; transition point in aqueous solution to the anhydrous salt, 30° C.; specific gravity 1.51 at 15°/4° C. The solubilities and specific gravities of a saturated aqueous solution of sodium thiocyanate are as follows:

| Temperature | Grams NaCNS per liter of solution | Grams NaCNS per 100 gm. of solution | Specific gravity at saturation temperature |
|---|---|---|---|
| *Degrees centigrade* | | | |
| +30 | 847 | 61.0 | 1.388 |
| +25 | 802 | 58.5 | 1.370 |
| +20 | 760 | 56.0 | 1.357 |
| +15 | 726 | 54.0 | 1.345 |
| +10 | 692 | 51.8 | 1.337 |
| 0 | 644 | 48.6 | 1.322 |
| −10 | 600 | 45.7 | 1.309 |
| −20 | 557 | 43.0 | 1.297 |
| −30 | 518 | 40.3 | 1.287 |
| −37 | 500 | 39.0 | 1.282 |

The last temperature in the above table, −37° C., is the cryohydric point, that is, the temperature at which the eutectic mixture solidifies, and it is the lowest temperature which can be reached in the liquid state. The formula of the cryohydrate is $NaCNS.2H_2O+5H_2O$. It contains by weight about 39% of NaCNS and 61% of water. The hydrate, $NaCNS.2H_2O$, contains by weight about 69% of NaCNS and 31% of water. The hydrate, $NaCNS.2H_2O$, ordinarily crystallizes in clear, colorless, long needle-like prisms. The solution has a strong tendency to supersaturate; and when crystallized from such a solution by "seeding" with crystals of the hydrate, the crystals so formed are exceedingly fine needles. On standing, the needles "grow" in size, and may even become blocky in appearance. As mentioned, supersaturation is very marked. Although the transition point between the hydrate and the anhydrous salt in water solution is 30° C., the saturated solution can be easily super-cooled to 10° C. or even to 0° C. The heat of crystallization is large. A supercooled solution at 10° C. when "seeded" will at first almost solidify with a matted mass of needle-like crystals, but the heat liberated will cause the temperature to rise in a few seconds to 20 or 30° C., resulting in a redissolving of a large part of the crystals. The rate of propagation of the hydrate crystals is very rapid, the entire solution solidifying to a crystalline mass almost instantly, and does not appear to be hindered by the viscous character of the concentrated solution at low temperatures.

The vapor tension of the hydrate, $NaCNS.2H_2O$, is a little greater at ordinary temperatures (20 to 25° C.) than the partial pressure of the moisture in the atmosphere under normal humidity, and hence the hydrate effloresces, the transparent hydrate crystals becoming coated with a white opaque layer of the anhydrous salt. However, if the humidity of the atmosphere increases very much above normal, the hydrate quickly absorbs water and deliquesces. The same thing may also occur on lowering the temperature to 10 or 0° C., due to increase in relative humidity, coupled with decrease in the vapor tension of the hydrate. If cooled during preparation, on separation from the solution the hydrate will condense moisture from the air and may dissolve. Since the heat of solution is endothermic, this reaction proceeds quite rapidly.

Although the hydrate of sodium thiocyanate melts at 33° C., it lacks sufficient water (by about 8%) to dissolve the anhydrous salt which separates. In order to obtain a clear solution, the melted crystals must be heated to about 95 or 100° C. On cooling the melted hydrate, it will not completely solidify, as the separation of the anhydrous salt before the transition temperature of 30° C. is reached has increased the ratio of water to NaCNS beyond the proportion in $NaCNS.2H_2O$.

The properties of the aqueous solution of the hydrate and its relation to the anhydrous salt are shown graphically in Figure 1. Temperatures in degrees centigrade are shown as ordinates, and the grams per liter of sodium thiocyanate, NaCNS, as abscissæ. In Figure 1, the curve UT shows the solubility of the hydrate, and the curve TR the solubility of the anhydrous salt. The intersection of these two curves at T is the transition temperature between the hydrate and anhydrous salt. The extension of the anhydrous solubility curve, TR, shown by the dotted line TS, is the solubility of the supersaturated anhydrous salt. The shaded area bounded by $TSS_1$, is the region of supersaturation, which is very important in the operation of the process. The curve WU is the lowering of the freezing point curve, and its intersection with the curve UT at U is the cryohydric point. The curve $W_1T_1$ is the boiling point curve. The lines $U_1U$ and $T_1T$ show the respective temperatures and concentrations which must be obtained by boiling, in order that on cooling the solutions to the cryohydric and transition temperatures, the solutions will have the same concentrations as the saturated solutions at these respective temperatures. For instance, a solution boiling at $T_1$ will have a concentration of approximately 800 grams per liter, and on cooling to the transition temperature, 30° C., will increase in concentration due to change in specific gravity, until it contains approximately 850 grams per liter, which is the saturation point at the transition temperature, as shown by the letter T. Likewise, any other solution heated to boiling points between $U_1$ and $T_1$, on cooling will change in concentration in accordance with lines approximately parallel to $T_1T$ and $U_1U$ and intersecting the solubility curve UT. At boiling points below $U_1$, the slope of the cooling lines becomes more nearly vertical, until at $W_1W$, which represents pure water, there is no longer any slope.

Solutions containing a high percentage of sodium thiocyanate and mixtures of sodium thiocyanate and sodium thiosulphate are obtainable as a byproduct from certain gas purification processes. For instance, in the removal of sulphur from gas, such as coke oven gas, the gas is brought into contact with an alkaline solution which is continuously circulated and aerated. The alkali usually consists of sodium carbonate. The sulphur in the gas, which is in the form of hydrogen sulphide, $H_2S$, reacts with the sodium carbonate, $Na_2CO_3$, to form sodium bicarbonate, $NaHCO_3$, and sodium hydrosulphide, NaHS. The sodium carbonate also reacts with carbon dioxide, $CO_2$, which is present in the gas, to form the bicarbonate. When the resulting solution containing sodium bicarbonate and sodium hydrosulphide, together with the unchanged sodium carbonate, is aerated, part of the sodium hydrosulphide is changed to sodium thiosulphate, $Na_2S_2O_3$. The remainder is decomposed back to sodium carbonate, water, carbon dioxide, and hydrogen sulphide. The regenerated solution of sodium carbonate is then used for further gas purification treatment. In addition to the hydrogen sulphide and carbon dioxide in the gas, there is present some cyanogen or hydrocyanic acid HCN, which reacts to form sodium thiocyanate, NaCNS. In the above process of gas purification, there is an accumulation in the regenerated liquor, of sodium thiosulphate and sodium thiocyanate. Periodically, this liquor is evaporated so as to crystallize out most of the sodium carbonate, which is again dissolved and used in the gas purification process. This crystallization is best conducted hot. The mother liquor from this operation contains principally sodium thiosulphate and sodium thiocyanate, together with a small amount of sodium carbonate or bicarbonate and certain impurities which impart a dark color. Most of the sodium thiosulphate can be separated in a comparatively pure form from this mother liquor by a cold crystallization, leaving a second mother liquor rich in sodium thiocyanate, but containing some sodium thiosulphate, together with a relatively small amount of sodium carbonate or bicarbonate; for instance, such a mother liquor may contain in the neighborhood of 650 grams per liter of sodium thiocyanate and 90 grams per liter of sodium thiosulphate.

The present invention will be explained with particular reference to the recovery of sodium thiocyanate from the above described mother liquor obtained from gas purification, it being understood, however, that the invention is not limited to such application but may be employed for the recovery, separation, or purification of thiocyanates occurring in other solutions or obtained from other sources.

Referring now to the specific embodiment of the process as applied to the recovery of sodium thiocyanate from the above described mother liquor:—

The mother liquor containing principally sodium thiocyanate contaminated with sodium thiosulphate and other impurities, is concentrated by evaporation until the solution is just saturated with sodium thiocyanate at the transition point between the hydrate and the anhydrous salt. Referring to the graph in Figure 1, the boiling of the solution will be carried to the point $T_1$. The solution is then cooled to the transition point and "seeded" with a few crystals previously obtained of the hydrated thiocyanate. Referring to Figure 1, the cooling will take place along the line $T_1T$ to the transition point T (30° C.). The cooling is continued to 10 to 20° C. below the transition point, the mixture being stirred occasionally to prevent caking of the hydrate crystals. The mixture is allowed to stand at this reduced temperature for one or more days so as to permit the hydrate crystals to "grow" in size. The hydrate crystals are then separated from the mother liquor by settling and centrifuging. If the crystals are large, they may be washed with a little cold water.

The hydrate crystals may be further purified by recrystallization, or they may be evaporated directly to dryness, depending on the character of the original liquor and the purity desired in the finished product.

The mother liquor from which the crystals are separated by settling and centrifuging is further evaporated and crystallized for the recovery of an additional crop of hydrate crystals. This operation is repeated until the concentration of sodium thiosulphate or other impurities is such as to require their partial removal by any of the well known methods.

In Figure 2 is shown schematically an arrangement of apparatus for carrying out the process. In the illustrated form of apparatus, the crude thiocyanate mother liquor containing the thiocyanate and contaminated with some thiosulphate and other impurities, is stored in the tank A, from which it is fed into the evaporator B. Here, the liquor is concentrated until the solution is saturated with NaCNS at its transition point to the hydrate. For the pure salt, this corresponds to a gravity of about 1.38 at 40° C. or about 1.30 at the boiling temperature, which is about 130° C. Such solution contains approximately 61% by weight of the anhydrous salt, NaCNS, which is equivalent to about 800 grams per liter of NaCNS measured at the boiling point, or about 850 grams per liter measured at the transition point (30° C.). Because of the presence of thiosulphate and other impurities, the gravities, temperatures, etc., will be a little different from the above figures. However, for operating purposes these figures are sufficiently accurate. In general, the tendency of the thiosulphate is to slightly increase the gravity and decrease the boiling point.

If the concentrated liquor from the evaporator B contains solid impurities, it is passed through a filter press J. This, however, is usually not required at this stage of the operation, in which case the liquor is bypassed to the crystallizer C, provided with a water jacket for cooling purposes and scrapers to prevent caking of the crystals on the sides and bottom of the apparatus. The liquor is cooled in the crystallizer to about 30° C. (the transition point between the anhydrous salt and the hydrate), and "seeded" with a handful of small crystals of the sodium thiocyanate hydrate, NaCNS.2H$_2$O, and the solution slowly agitated. If the hydrate does not start to crystallize out immediately the original liquor was not quite sufficiently concentrated, in which case it will be necessary to continue to add hydrate crystals from time to time during the cooling process until crystallization begins. For the best results, the temperature at which the crystallization starts should be as close to 30° C. as possible, and not under 25° C. The specific gravity of the solution at this point should be about 1.39.

Cooling is continued to a temperature of 20 to 10° C. The amount of cooling in commercial practice will ordinarily depend on the temperature of the cooling water and on the atmospheric conditions. As a rule, it is not desirable to cool more than about 10 degrees below atmospheric temperature, as a low temperature of the crystals will cause them to condense moisture from the atmosphere when they are separated from the liquor. In case the atmospheric humidity is very low, this precaution is not necessary. Cooling below about 10° C. will cause the crystals to become so densely matted and the liquid so viscous as to make centrifuging difficult. Failure to cool below about 20° C. will result in a large part of the salt remaining in solution. Ordinarily the best temperature for crystallization is between 15 and 20° C. The specific gravity of the crystals (1.51) is slightly greater than that of the liquid, and if the mixture is slightly agitated the crystals will sink to the bottom of the crystallizer. In this way it is possible to avoid running the entire mixture through the centrifuge in the next operation. Lowering the temperature below about 10° C. not only increases the viscosity of the liquid and causes the crystals to adhere in masses, but also increases the specific gravity of the liquid, lessening the difference in gravity between the crystals and the liquid, and consequently partial separation by settling becomes increasingly difficult.

It is best to allow the crystals to "grow" in size in the crystallizer for one or more days before centrifuging. Freshly formed crystals are liable to be small and result in a pasty mass from which the mother liquor cannot be easily removed.

From the crystallizer C, the crystalline hydrate is conveyed by means of the chute K to the centrifuge D. Herein it is separated from the clinging mother liquor which is run into the sump tanks H. The supernatant mother liquor in the crystallizer C may also be run through the centrifuge D for the separation of the small amount of crystals which remain in suspension. However, it is preferable to bypass directly into the sump tanks H, as shown in the drawing. If the dried hydrate crystals in the centrifuge basket are large and well formed, it is advisable to wash with a little cold water.

The hydrate from the centrifuge D is dumped into the receiver E, from whence it is conveyed to the evaporator kettle F, where it is evaporated to complete dryness. The temperature required for such evaporation is about 150° C., although good results are obtainable up to 180° C. Above 200° C. discoloration takes place. Below 150° C. drying is very slow. Various types of apparatus may be used for drying, as, for instance, a rotary steam cylinder immersed in the melted hydrate and provided with a scraper to remove the dehydrated film of the salt which adheres to the surface of the cylinder. With such an apparatus which dries the material in a thin layer, lower temperatures may be employed, around 125° C. Other well known methods of dehydration may also be employed, such as atomizing in a warm atmosphere, rotary drying kilns, tray ovens, vacuum driers, etc.

From the evaporating kettle F the dry thiocyanate is transferred to storage or suitable packages G, which should be air-tight, as the anhydrous salt is hydroscopic. The melting point of the anhydrous salt is close to 302° C. The salt expands on fusion. On cooling, it solidifies at the same temperature to a hard crystalline mass having approximately the same specific gravity as the salt prepared from aqueous solution, namely 1.64 at 25°/4° C. The anhydrous salt is snow-white in appearance and very hydroscopic. It is very soluble in water and alcohol, and but slightly soluble in ether and benzol.

In case it is desired to further purify the thiocyanate, which is usually advisable, recrystallization is employed. This is carried out by melting the hydrate in the evaporating kettle F. Since the hydrate does not carry enough water to effect complete solution in the neighborhood of the transition temperature, it is necessary to add a small amount of water. The hydrate contains 31% by weight of water; and 39% by weight of water is required in order to have just complete saturation at the transition temperature between the hydrate and the anhydrous salt. After adding the calculated amount of water, the mixture is heated to about 80° C. until solution is complete. The specific gravity should be about 1.34 at this temperature. The solution is allowed to cool to about 40 to 45° C. and is then pumped by means of the pump I through the filter press J into the crystallizer C. If the solution is absolutely free from solid matter, the filter press J may be bypassed as shown in the drawing. However, care should be employed in omitting this filtering operation, as the liquor often contains finely divided material of a gelatinous nature capable of carrying down with it considerable of the dark coloring impurities.

The operation in the crystallizer C, centrifuge D, and evaporating kettle F is the same as previously described, the final product being the purified dry thiocyanate salt.

The further repurification by recrystallization may be carried out in a like manner as often as desired.

The mother liquors accumulated in the sump tanks H are conveyed by means of the pump I and the evaporator B, and are then subjected to the same operations as the original liquor and fed from the storage tank A, for the recovery of additional crops of the thiocyanate hydrate crystals. In this case, however, it is not unusual for considerable impurities to separate, and the concentrated liquor in B should be run first through the filter press J, preferably at a temperature of about 40 to 45° C., before delivery to the crystallizer C.

The residual filter cakes from the filter press J are very small in amount, containing chiefly thiosulphates, carbonates, free sulphur, free carbon, organic material, iron compounds, etc., which can either be discarded or returned to the thiosulphate process. After the mother liquor has been run through the thiocyanate hydrate process two or three times, the impurities, such as sodium thiosulphate, become so concentrated that it is advisable to return the liquor to the thiosulphate process, as indicated in the drawing by the pipe line 2.

While I have specifically described and diagrammatically illustrated the preferred steps and their sequence in carrying out my process, and have suggested by way of examples types of apparatus, temperature and concentration control conditions, it will be obvious to those skilled in the art that many variations may be made without departing from the essence of the invention. For example, vacuum evaporators may be employed; various types of filtering apparatus may be substituted for the centrifuge and filter press; and, furthermore, the process may be applied to the separation of thiocyanates from substances other than thiosulphates. It is therefore to be understood that the invention is not limited to its preferred embodiment or to the details of the foregoing description, but may be otherwise embodied within the scope of the following claims.

I claim:

1. Those steps in the process of recovering a thiocyanate from an impure solution, which consist in forming a hydrate of the thiocyanate and separating it from the solution, substantially as described.

2. Those steps in the process of recovering an alkali metal thiocyanate from an impure solution, which consist in forming a hydrate of the thiocyanate and separating it from the solution, substantially as described.

3. Those steps in the process of recovering sodium thiocyanate from an impure solution, which consist in forming a hydrate of the sodium thiocyanate and separating it from the solution, substantially as described.

4. That step in the process of recovering a thiocyanate from a solution containing the thiocyanate and a thiosulphate, which consists in separating the thiocyanate from the solution as a crystalline hydrate, substantially as described.

5. That step in the process of recovering sodium thiocyanate from a solution containing sodium thiocyanate and sodium thiosulphate, which consists in separating the sodium thiocyanate from the solution as a crystalline hydrate, substantially as described.

6. The process of recovering a thiocyanate from an impure solution of the thiocyanate, comprising concentrating the solution to such a concentration as will upon cooling below the transition point between the anhydrous salt and the hydrate, yield hydrate crystals, cooling the thus concentrated solution so as to cause crystallization of the hydrate therefrom, and separating the hydrate crystals from the liquor, substantially as described.

7. The process of recovering sodium thiocyanate from an impure solution containing sodium thiocyanate, comprising concentrating the solution to such a concentration as will upon cooling below the transition point between the anhydrous salt and the hydrate, yield hydrate crystals, cooling the thus concentrated solution so as to cause crystallization of the hydrate therefrom, and separating the hydrate crystals from the liquor, substantially as described.

8. The process of recovering alkali metal thiocyanates from aqueous solutions containing alkali metal thiocyanates and alkali metal thiosulphates, comprising concentrating the solution to approximately such concentration that it will be substantially saturated upon cooling to the transition temperature between the anhydrous thiocyanate and its hydrate, cooling below such transition temperature so as to cause crystallization of the hydrate from the solution, and separating the crystalline hydrate from the solution, substantially as described.

9. The process of recovering sodium thiocyanates from aqueous solutions containing sodium thiocyanates and sodium thiosulphates, comprising concentrating the solution to approximately such concentration that it will be substantially saturated upon cooling to the transition temperature between the anhydrous thiocyanate and its hydrate, cooling below such transition temperature so as to cause crystallization of the hydrate from the solution, and separating the crystalline hydrate from the solution, substantially as described.

10. The process of recovering thiocyanates from aqueous solutions containing thiocyanates and thiosulphates, comprising concentrating the solution to approximately such concentration that it will be substantially saturated upon cooling to the transition temperature between the anhydrous thiocyanate and its hydrate, cooling below such transition temperature so as to cause crystallization of the hydrate from the solution, and separating the crystalline hydrate from the solution, substantially as described.

11. The process of recovering sodium thiocyanate from impure aqueous solutions thereof, comprising concentrating the solution until the boiling temperature of the liquid is in the neighborhood of 130° C. at ordinary atmospheric pressures, cooling the concentrated solution below 30° C. so as to cause crystallization of the hydrate of sodium thiocyanate therefrom, and separating the crystalline hydrate from the solution, substantially as described.

12. The process of recovering sodium thiocyanate from impure aqueous solutions thereof, comprising concentrating the solution until the boiling temperature of the liquid is in the neighborhood of 130° C. at ordinary atmospheric pressures, cooling the solution to between 20 and 30° C. so as to start crystallization therefrom of the hydrate of sodium thiocyanate, continuing the cooling to between 0 and 20° C., and separating the crystalline hydrate from the solution, substantially as described.

13. As a new article of manufacture, the hydrate of sodium thiocyanate, $NaCNS.2H_2O$, substantially as described.

In testimony whereof I have hereunto set my hand.

MARC DARRIN.